United States Patent
Jüngling et al.

(10) Patent No.: US 6,476,133 B1
(45) Date of Patent: Nov. 5, 2002

(54) METHOD FOR PRODUCING A SOLUTION OF DIENE POLYMERS IN VINYL AROMATIC COMPOUNDS AND METHOD FOR PRODUCING RESISTANT VINYL AROMATIC POLYMERS BY POLYMERIZING THE SAME SOLUTION

(75) Inventors: Stephan Jüngling, Mannheim; Hermann Gausepohl, Mutterstadt, both of (DE); Volker Warzelhan, Singapore (SG)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/936,350

(22) PCT Filed: Aug. 1, 2000

(86) PCT No.: PCT/EP00/07451

§ 371 (c)(1),
(2), (4) Date: Sep. 11, 2001

(87) PCT Pub. No.: WO01/10917

PCT Pub. Date: Feb. 15, 2001

(30) Foreign Application Priority Data

Aug. 4, 1999 (DE) ......................................... 199 36 566

(51) Int. Cl.⁷ ............................ C08F 8/00; C08F 279/00
(52) U.S. Cl. ........................ 525/122; 525/271; 525/272; 525/305; 525/308; 525/316; 525/370; 525/385; 526/173; 526/177
(58) Field of Search ............................ 525/271, 272, 525/122, 305, 308, 310, 316, 370, 385; 526/173, 177

(56) References Cited

U.S. PATENT DOCUMENTS

| 3,278,508 A | * | 10/1966 | Kahle et al. ............. 526/177 X |
| 3,658,946 A | | 4/1972 | Bronstert et al. ........... 260/878 |
| 4,153,647 A | * | 5/1979 | Glukhovshoi et al. ...... 525/250 |
| 6,107,408 A | * | 8/2000 | Quirk et al. ................. 525/272 |
| 6,303,721 B1 | * | 10/2001 | Latsch et al. ........... 526/177 X |

FOREIGN PATENT DOCUMENTS

| DE | 17 70 392 | 3/1972 |
| EP | 0 059 231 | 9/1982 |
| WO | WO 98/07765 | 2/1998 |
| WO | WO 98/07766 | 2/1998 |

* cited by examiner

*Primary Examiner*—Fred Teskin
(74) *Attorney, Agent, or Firm*—Keil & Weinkauf

(57) ABSTRACT

A process for preparing a solution of high molecular weight polymers of conjugated dienes in a vinylaromatic hydrocarbon by anionic polymerization of the diene in the presence of an alkyllithium as catalyst and a process for preparing impact-modified polymers of vinylaromatic compounds is described. The first process comprises firstly polymerizing the diene in solution in an aromatic hydrocarbon which is free of ethylenic double bonds to a molecular weight below about $10^5$, then adding a trialkylaluminum in a molar excess relative to the alkyllithium, diluting the solution obtained with the vinylaromatic compound and then coupling the polydiene with a polyepoxide or an alkyl (meth)acrylate to give a high molecular weight polymer. The solution obtained in this way is further processed to give an impact-modified polymer of a vinylaromatic hydrocarbon by polymerizing the solution prepared as described, if desired after addition of further amounts of a vinylaromatic compound, in a manner known per se.

12 Claims, No Drawings

METHOD FOR PRODUCING A SOLUTION OF DIENE POLYMERS IN VINYL AROMATIC COMPOUNDS AND METHOD FOR PRODUCING RESISTANT VINYL AROMATIC POLYMERS BY POLYMERIZING THE SAME SOLUTION

The invention relates to a process for preparing a solution of polymers of conjugated dienes in vinylaromatic compounds, in particular styrene or substituted styrenes, and to a process for preparing impact-modified polymers of vinylaromatic compounds, in particular impact-modified polystyrene, by polymerization of this solution.

It is known that impact-modified polystyrene (high impact polystyrene—HIPS) can be prepared by catalytic polymerization of a solution comprising polymerized conjugated dienes in styrene or substituted styrenes.

DE-A 1770 392 describes the free-radical polymerization of a solution of from 1 to 14% by weight of a rubber-like polymer in a polymerizable vinylaromatic compound in a plurality of stages to a solids content of more than 60% by weight. This finally gives a solid dispersion of rubber particles in a polystyrene base. Here, polystyrene chains are also grafted onto the rubber to varying degrees.

The solution used in the polymerization is obtained by dissolving the rubber-like diene polymer in the vinylaromatic monomer. This procedure is cumbersome, since it requires firstly the preparation of the diene polymer, the work-up and isolation thereof and subsequently dissolution in the vinylaromatic monomer. Preparation of the impact-modified vinylaromatic polymer by polymerization of the monomers in one step would be desirable.

EP-A 59231 describes the anionic polymerization of butadiene in styrene as solvent in the presence of alkyllithium as catalyst, giving a styrene-butadiene rubber having a low styrene content. After the polymerization has been stopped, the remaining monomeric butadiene is separated off and the styrene is, if desired after addition of further amounts of this monomer, copolymerized to give impact-modified polystyrene. Due to the relationship between the copolymerization parameters of butadiene and styrene in this system and the high styrene concentration, a considerable proportion of styrene is built into the polymer even at a conversion of only 30% of the butadiene, which results in an undesirable increase in the glass transition temperature of the rubber phase in the finished product. Although the reaction can be stopped before complete conversion of the butadiene, the polybutadiene formed then has to be purified by precipitation or the solvent together with other volatile substances, in particular monomeric butadiene, has to be distilled off.

WO 98/07765 describes the anionic polymerization or copolymerization of butadiene in styrene solution in the presence of catalysts comprising mixed alkali metal alkyls. Here too, a copolymer having a high styrene content is obtained.

It is an object of the present invention to propose a process for preparing a solution of high molecular weight polymers of conjugated dienes in a vinylaromatic hydrocarbon, which solution can be used without complicated isolation or separation steps to prepare impact-modified polymers of the vinylaromatic hydrocarbon which comprise virtually no monomeric diene and a polydiene phase having a low content of units of polymerized vinylaromatic compounds.

The present invention starts out from a process for preparing a solution of high molecular weight polymers of conjugated dienes in a vinylaromatic hydrocarbon by anionic polymerization of the diene in the presence of an alkyllithium as catalyst.

In the process of the present invention, the diene is firstly polymerized in solution in an aromatic hydrocarbon which is free of ethylenic double bonds to a molecular weight Mw below about $10^5$, a trialkylaluminum is then added in a molar excess relative to the alkyllithium, the solution obtained is diluted with the vinylaromatic compound and the polydiene is then coupled with a polyepoxide or an alkyl (meth)acrylate to give a high molecular weight polymer.

The present invention also provides a process for preparing impact-modified polymers of vinylaromatic compounds, in particular impact-modified polystyrene, which comprises polymerizing a solution obtained by the above-described process, if desired after addition of further amounts of vinylaromatic compound, in a manner known per se.

The anionic diene polymerization according to the present invention forms a living polymer, i.e. a polymer whose chain formation is ended by consumption of the monomer and not by a termination or deactivation reaction. This means that the polymerization continues at the end of the chain when further amounts of monomer are added.

The polymerization according to the present invention of a conjugated diene is carried out in solution in an aromatic hydrocarbon, for example in toluene, xylene or ethyl benzene. The amount of solvent should be sufficient for the viscosity of the resulting polydiene solution to remain low enough to ensure good mixing of the reaction solution. On the other hand, the amount of inert solvent should be kept as small as possible in order to keep the energy requirement for separating it from the end product low or even to avoid the separation completely. In general, the amount is chosen so that a 20–40% strength, preferably 25–35% strength, polydiene solution is obtained.

As conjugated dienes, preference is given to those having 4–7 carbon atoms, e.g. butadiene, isoprene, 2,3-dimethylbutadiene, 1,3-pentadiene and 1,3-hexadiene, in particular butadiene and isoprene.

The process of the present invention makes it possible to obtain a polymer which has a molecular weight which is not too high, approximately in the range below $10^5$, preferably from $10^4$ to $10^5$, in the first stage of the diene polymerization by appropriate introduction of the catalyst, so that the solution of the polymer has a comparatively low viscosity, since this depends exponentially on the molecular weight of the dissolved material. In this first polymerization stage, it is particularly advantageous to use a mixture of alkyllithium and trialkylaluminum as catalyst, with the molar amount of the trialkylaluminum being smaller than that of the alkyllithium, calculated as mol of Al/mol of Li. It is preferably 0.1–0.9:1. The trialkylaluminum acts as a retarder which moderates the catalytic activity of the alkyllithium but does not prevent the polymerization of the diene. A further effect of the catalyst mixture is that the polymer chains formed have a lower tendency to associate formation and thus form solutions having a lower viscosity.

The alkyllithium and trialkylaluminum compounds used in the process of the present invention preferably contain alkyl groups having from 3 to 6 carbon atoms. These may be linear or branched; in the case of the aluminum compounds, branched alkyl radicals are preferred. Particular preference is given to $C_4$-alkyl radicals.

In the next stage of the polymer preparation, the molecular weight is increased by coupling the polydiene anions with a coupling agent which is able to react at least bifunctionally with the polymer chains. As coupling agents, use is made of polyepoxides or alkyl (meth)acrylates. Firstly, a molar excess of Al over Li is established by addition of trialkylaluminum. This reduces the catalytic activity to such an extent that it is no longer sufficient to polymerize vinylaromatic hydrocarbons, in particular styrene. The excess is preferably in the range from 1.2 to 1.7 mol of Al per mol of Li. Monomeric vinylaromatic is then added to give a more dilute solution whose viscosity allows a further molecular weight increase by coupling. The coupling agent should be at least bifunctional, i.e. contain at least two groups capable of reacting with the polymer anion. (Meth)acrylates, i.e. acrylates or methacrylates, can react both via the ester groups and via the double bonds. As has been found, a triple coupling reaction on a (meth)acrylic ester group is also possible. Examples of suitable coupling agents are ethylene glycol diglycidyl ester, 1,4-butanediol diglycidyl ester, methyl methacrylate, n-butyl acrylate, ethyl methacrylate, isopropyl acrylate and 1,4-butanediol diacrylate. Use is generally made of alkyl (meth)acrylates having from 1 to 6 carbon atoms in the alkyl group. Although the trialkylaluminum lowers the activity sufficiently to prevent polymerization of vinylaromatics, coupling with the more active coupling agents mentioned is still possible. The coupling reaction is preferably carried out at elevated temperature, in particular in the range 30–70° C.

As vinylaromatic compounds, preference is given to using low molecular weight, i.e. monocyclic, aromatics, in particular styrene or substituted styrenes, such as α-methylstyrene, p-methylstyrene, ethylstyrene, tert-butylstyrene and also 1,1-diphenylethylene; unsubstituted styrene is particularly preferred.

The rubber solution obtained from the anionic diene polymerization and the subsequent coupling reaction can be used directly or after dilution with further vinylaromatic compound to prepare an impact-modified vinylaromatic polymer, in particular impact-modified polystyrene. The polymerization of the vinylaromatic can be carried out anionically or by a free-radical mechanism.

Suitable free-radical initiators are peroxides, for example diacyl peroxides, dialkyl peroxides, diaryl peroxides, peroxyesters, peroxydicarbonates, peroxyketals, peroxosulfates or hydroperoxides, or azo compounds. Preference is given to using dibenzoyl peroxide, 1,1-di-tert-butylperoxocyclohexane, dicumyl peroxide, dilauryl peroxide and azobisisobutyronitrile.

As auxiliaries, it is possible to add molecular weight regulators such as dimeric α-methylstyrene, mercaptans such as n-dodecyl mercaptan or tert-dodecyl mercaptan, chain branching agents, stabilizers or mold release agents.

The polymerization of the matrix can be carried out in bulk or in solution. The polymerization is generally carried out at from 50 to 200° C., preferably from 90 to 150° C., in the case of free-radical polymerization, and at from 20 to 180° C., preferably from 30 to 80° C., in the case of anionic polymerization. The reaction can be carried out isothermally or adiabatically.

The following examples illustrate preferred embodiments of the process of the present invention. All work was carried out under nitrogen, either using the Schlenk technique or in a glove box. The toluene used as solvent was, like the monomers butadiene and styrene, purified by passing it over aluminum oxide beads under nitrogen. The sec-butyllithium was used as a refrigerated 1.5 molar solution in cyclohexane/hexane mixture (Chemetall); the triisobutylaluminum was used as a commercial 1 molar solution in toluene (Aldrich Chem. Co.).

The polybutadienyllithium was coupled in the presence of an excess of triisobutylaluminum and styrene as solvent component. The following procedure was used for this:

2300 ml (2000 g) of toluene were placed in a 6 liter glass reactor provided with a reflux condenser and were admixed with 0.3 ml of diphenylethylene. The solution was heated to 40° C. and titrated with sec-butyllithium solution to the color change to yellow/orange. The solution was then warmed to an external temperature of 6° C. and initiated using 11.5 ml (17.2 mmol) of sec-butyllithium solution. 857 g (15.9 mol; about 1320 ml) of butadiene were then allowed to run in under an appropriate superatmospheric pressure over a period of 140 minutes, with the temperature rising to a maximum of 68° C. 2 hours 20 minutes after the end of the butadiene addition, 10 ml (sample 1) were taken out and the reaction was stopped by addition of 1 drop of ethanol. Subsequently, 29.2 ml (29.2 mmol) of triisobutylaluminum solution were added to the mixture. 3150 ml of styrene were then allowed to run in and the mixture was stirred for 30 minutes. Part of the polymer solution was then transferred to a two-neck flask which had been flushed with nitrogen and introduced into the glove box. 20 g of the polymer solution were in each case transferred to 50 ml ampoules and the ampoules were closed. The ampoules were taken from the glove box and heated to 60° C. on a water bath. The coupling agent 1,4-butanediol diglycidyl ether (0.25 mol/mol of Li) was added by means of disposable syringes and the coupling was stopped one hour after the addition by means of 0.2 ml of ethanol (sample 2).

According to GPC analysis, sample 1 had a monomodal molecular weight distribution with $M_w$=64,900 g/mol and $M_n$=63,400 g/mol. Sample 2 displayed a further peak which had a percentage by area of 36% and corresponded to a coupling product having a molecular weight of 132,220 g/mol. For the overall sample, $M_w$=88,900 g/mol and $M_n$=77,090.

Table 1 below shows, for Examples 1 to 15 and Comparative Examples 1 to 3, the data and results of the coupling of polybutadienyl anions at 60° C. in the presence of triisobutylaluminum and sec-butyllithium in a molar ratio of 1.7:1 (Al:Li) in serum bottles. D is the ratio of $M_w$ to $M_n$. The number of peaks in the GPC is shown in the second-last column; the coupling yield is the ratio of the area under a peak to the total area in percent.

TABLE 1

| | | | $M_w$ | | | | |
|---|---|---|---|---|---|---|---|
| Example No. | Coupling agent | Molar ratio of coupl. a./Li | Before coupling | After coupling | D | Number of peaks | Coupling yield % |
| Comparison 1 | none | 0/1 | 31400 | | 1.04 | 1 | <5 |
| 1 | n-butyl acrylate | 0.25/1 | 31400 | 52000 | 1.28 | 3 | 47 |
| 2 | n-butyl acrylate | 0.5/1 | 31400 | 53000 | 1.30 | 3 | 47 |
| 3 | n-butyl acrylate | 1/1 | 31400 | 60800 | 1.43 | 3 | 51 |

TABLE 1-continued

| | | | $M_w$ | | | | |
|---|---|---|---|---|---|---|---|
| Example No. | Coupling agent | Molar ratio of coupl. a./Li | Before coupling | After coupling | D | Number of peaks | Coupling yield % |
| 4 | n-butyl acrylate | 3/1 | 31400 | 58000 | 1.40 | 3 | 48 |
| 5* | n-butylacrylate | 0.5/1 | 31400 | 36500 | 1.11 | 2 | 16 |
| 6** | n-butyl acrylate | 2 × 0.5/1 | 31400 | 52200 | 1.30 | 3 | 46 |
| 7*** | n-butyl acrylate | 0.5/1 | 31400 | 46300 | 1.20 | 3 | 43 |
| 8 | 1,4-butanediol diglycidyl ether | 0.25/1 | 31400 | 49000 | 1.16 | 2 | 58 |
| 9 | 1,4-butanediol diglycidyl ether | 0.5/1 | 31400 | 43900 | 1.16 | 2 | 38 |
| 10 | 1,4-butanediol diglycidyl ether | 1/1 | 31400 | 41200 | 1.17 | 3 | 24 |
| 11 | methyl methacrylate | 0.25/1 | 31400 | 41600 | 1.15 | 2 | 32 |
| 12 | methyl methacrylate | 0.5/1 | 31400 | 41700 | 1.15 | 2 | 32 |
| 13 | methyl methacrylate | 1/1 | 31400 | 42500 | 1.15 | 2 | 34 |
| 14 | methyl methacrylate | 3/1 | 31400 | 45200 | 1.17 | 2 | 42 |
| Comparison 2 | α,α-dibromo-p-xylene | 0.25/1 | 31400 | 34500 | 1.10 | 1 | <10 |
| Comparison 3 | α,α-dibromo-p-xylene | 0.5/1 | 31400 | 40000 | 1.30 | 1 | <10 |
| Comparison 4 | α,α-dibromo-p-xylene | 1/1 | 31400 | 41800 | 1.43 | 1 | <10 |
| Comparison 5 | Diethyl adipate | 1/4 | 29800 | 32300 | 1.09 | 2 | 13 |
| 15 | 1,4-butanediol diglycidyl ether | 0.5/1 | 32400 | 48000 | 1.19 | 2 | 48 |
| 16 | n-butyl acrylate | 1/1 | 43100 | 69900 | 1.33 | 3 | 40 |

*Triisobutylaluminum was repeatedly added 10 minutes before the addition of the coupling agent.
**After 30 minutes, further coupling agent was added.
***Reaction was terminated after only 5 minutes.

Table 2 shows the coupling data for Examples 15 to 24 and Comparative Example 5 in the same way as in Table 1. However, the ratio of Al/Li was reduced to 1.2:1 here.

Table 3 shows the data for Examples 28 to 32 and Comparative Examples 7 to 12. The results of couplings with polystyryl anions are shown here. The Al/Li ratio was again 1.7:1.

TABLE 2

| | | | $M_w$ | | | | Coupling | |
|---|---|---|---|---|---|---|---|---|
| Example No. | Coupling agent | Molar ratio of coupl. a./Li | Before coupling | After coupling | D | Number of peaks | yield % | Remarks |
| Comparison 6 | none | 0/1 | 30200 | | 1.06 | 1 | <5 | |
| 17 | n-butyl acrylate | 1/1 | 34300 | 46700 | 1.21 | 3 | 45 | 2nd peak 37%, 3rd peak 9% |
| 18 | n-butyl acrylate | 0.5/1 | 34300 | 53300 | 1.25 | 3 | 58 | 2nd peak 41%, 3rd peak 17% |
| 19 | n-butyl acrylate | 0.25/1 | 34300 | 56900 | 1.30 | >3 | 57 | 2nd peak 35%, peak 3+ 21% |
| 20 | 1,4-butanediol diglycidyl ether | 1/1 | 34300 | 43700 | 1.16 | 2 | 44 | |
| 21 | 1,4-butanediol diglycidyl ether | 0.5/1 | 34300 | 44100 | 1.15 | 2 | 45 | |
| 22 | 1,4-butanediol diglycidyl ether | 0.25/1 | 34300 | 43400 | 1.15 | 2 | 42 | |
| 23 | 1,4-butanediol diglycidyl ether | 0.25/1 | 34300 | 32300 | 1.05 | 2 | 6 | |
| 24 | methyl methacrylate | 1/1 | 34300 | 46600 | 1.18 | 3 | 48 | 2nd peak 43%, 3rd peak 5% |
| 25 | methyl methacrylate | 2/1 | 34300 | 46100 | 1.18 | 3 | 47 | 2nd peak 42%, 3rd peak 5% |
| 26 | methyl methacrylate | 3/1 | 34300 | 44100 | 1.18 | 3 | 44 | 2nd peak 40%, 3rd peak 4% |

TABLE 3

| | | | $M_w$ | | | | Coupling | |
|---|---|---|---|---|---|---|---|---|
| Example No. | Coupling agent | Molar ratio of coupl. a./Li | Before coupling | After coupling | D | Number of peaks | yield % | Remarks |
| Comparison 7 | none | | 2000 | | 1.07 | 1 | <10 | |
| Comparison 8 | Diethyl adipate | 0.25/1 | 2000 | 2200 | 1.03 | 1 | <10 | |
| 27 | n-butyl acrylate | 0.5/1 | 2000 | 3400 | 1.23 | 2 | 51 | |
| 28 | n-butyl acrylate | 3/1 | 2000 | 5700 | 1.74 | 3 | 60 | 2nd peak 21%, 3rd peak 39% |

TABLE 3-continued

| Example No. | Coupling agent | Molar ratio of coupl. a./Li | $M_w$ Before coupling | $M_w$ After coupling | D | Number of peaks | yield % | Remarks |
|---|---|---|---|---|---|---|---|---|
| Comparison 9 | none | | 11400 | | 1.03 | 1 | <10 | |
| 29 | 1,4-butanediol diglycidyl ether | 0.5/1 | 11400 | 12100 | 1.05 | 3 | 43 | 2nd peak 18%, 3rd peak 25% |
| Comparison 10 | none | | 11200 | | 1.03 | 1 | <10 | |
| 30 | 1,4-butanediol diacrylate | 0.25/1 | 11200 | 13400 | 1.12 | 2 | 18 | 2nd peak 17%, peak 3+ 38% |
| 31 | 1,4-butanediol diacrylate | 1.5/1 | 11200 | 43100 | 1.90 | >3 | 56 | |
| Comparison 11 | 1,2-dibromoethane | 0.5/1 | 11200 | 11300 | 1.03 | 1 | <10 | |
| Comparison 12 | α,α'-dibromo-p-xylene | 0.5/1 | 11200 | 12600 | 1.08 | 1 | <10 | |

We claim:

1. A process for preparing a solution of high molecular weight polymers of conjugated dienes in a vinylaromatic hydrocarbon by anionic polymerization of the diene in the presence of an alkyllithium as catalyst, wherein the diene is firstly polymerized in solution in an aromatic hydrocarbon which is free of ethylenic double bonds to a molecular weight $M_w$ below about $10^5$, a trialkylaluminum is then added in a molar excess relative to the alkyllithium, the solution obtained is diluted with the vinylaromatic compound and the polydiene is then coupled with a polyepoxide or an alkyl (meth)acrylate to give a high molecular weight polymer.

2. A process as claimed in claim 1, wherein the first polymerization stage is carried out in the presence of a catalyst comprising alkyllithium together with a trialkylaluminum in a molar amount which is smaller than that of the alkyllithium.

3. A process as claimed in claim 1, wherein the aromatic hydrocarbon used is ethyl benzene or toluene.

4. A process as claimed in claim 1, wherein the aromatic hydrocarbon is added in such an amount that the solution after the polymerization contains 20–40% by weight of diene polymer.

5. A process as claimed in claim 1, wherein an alkyllithium or alkylaluminum compound having from 3 to 6 carbon atoms in the alkyl group is used as catalyst.

6. A process as claimed in claim 5, wherein the alkylaluminum compound has branched alkyl groups.

7. A process as claimed in claim 1, wherein a diepoxide is used as polyepoxide.

8. A process as claimed in claim 1, wherein an alkyl (meth)acrylate having from 1 to 6 carbon atoms in the alkyl group is used.

9. A process as claimed in claim 1, wherein the conjugated diene used is butadiene or isoprene.

10. A process as claimed in claim 1, wherein the coupling of the polydiene is carried out at 30–70° C.

11. A process as claimed in claim 1, wherein the vinylaromatic compound used is styrene or a substituted styrene.

12. A process for preparing impact-modified polymers of vinylaromatic compounds, which comprises polymerizing a solution obtained by a process as claimed in claim 1, optionally after addition of further amounts of vinylaromatic compound, in a manner known per se.

* * * * *